Oct. 29, 1929.  C. SOMMERS  1,733,831
POULTRY FEEDER
Filed Nov. 16, 1928  2 Sheets-Sheet 1

Inventor
Charles Sommers,
By J Stanley Burch
Attorney

Oct. 29, 1929.  C. SOMMERS  1,733,831
POULTRY FEEDER
Filed Nov. 16, 1928   2 Sheets-Sheet 2
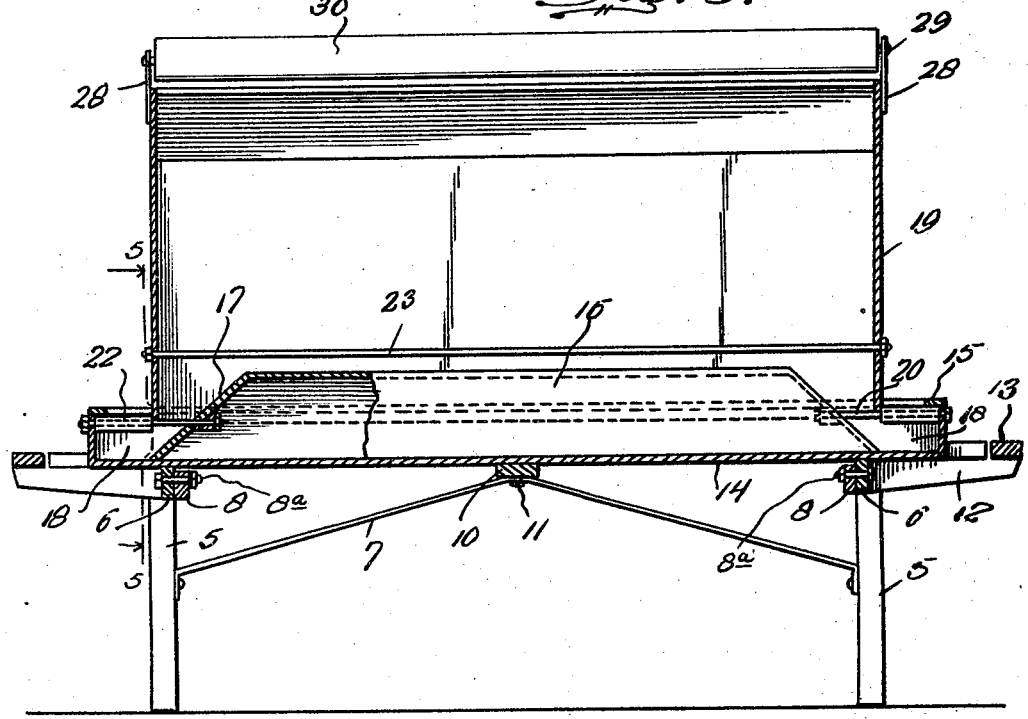
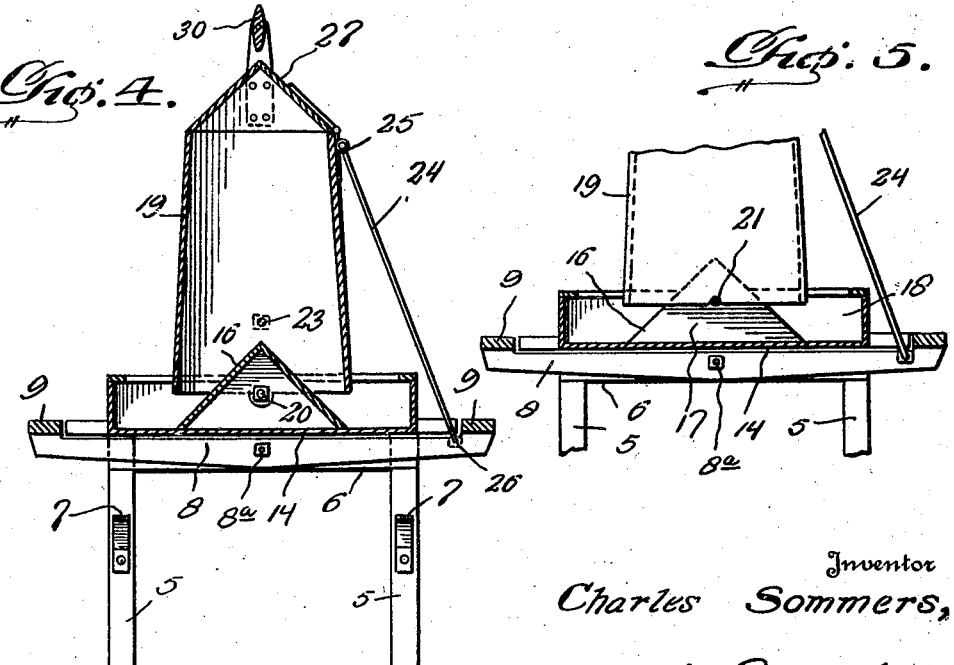
Inventor
Charles Sommers,
By J. Stanley Burch
Attorney Patented Oct. 29, 1929

1,733,831

UNITED STATES PATENT OFFICE

CHARLES SOMMERS, OF NORTH BRANCH, NEW YORK

POULTRY FEEDER

Application filed November 16, 1928. Serial No. 319,838.

This invention relates to a feeder for poultry, one of the objects being to provide a simple, compact and efficient device of this character which may be economically manufactured, and which may be readily kept clean and in working order.

Still another object is to provide a poultry feeder adapted to permit the simultaneous feeding of a maximum number of fowls, and in which efficient provision is made for preventing the feed from clogging in the hopper.

Other objects will become apparent as the nature of the invention is better understood, and the same consists in the novel form, combination and arrangement of parts hereinafter more fully described, shown in the accompanying drawings and claimed.

In the drawings:

Figure 3 is a central longitudinal sectional view of the same.

Figure 4 is a vertical transverse section on line 4—4 of Figure 2; and

Figure 5 is a fragmentary vertical transverse section taken on line 5—5 of Figure 3.

Figure 1:
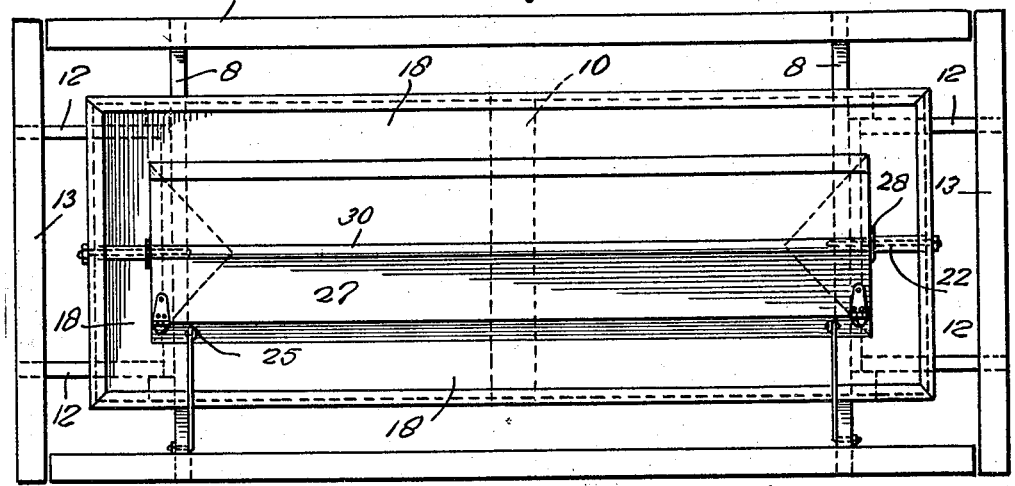
Figure 1 is a top plan view of a poultry feeder embodying the present invention.
Figure 2:
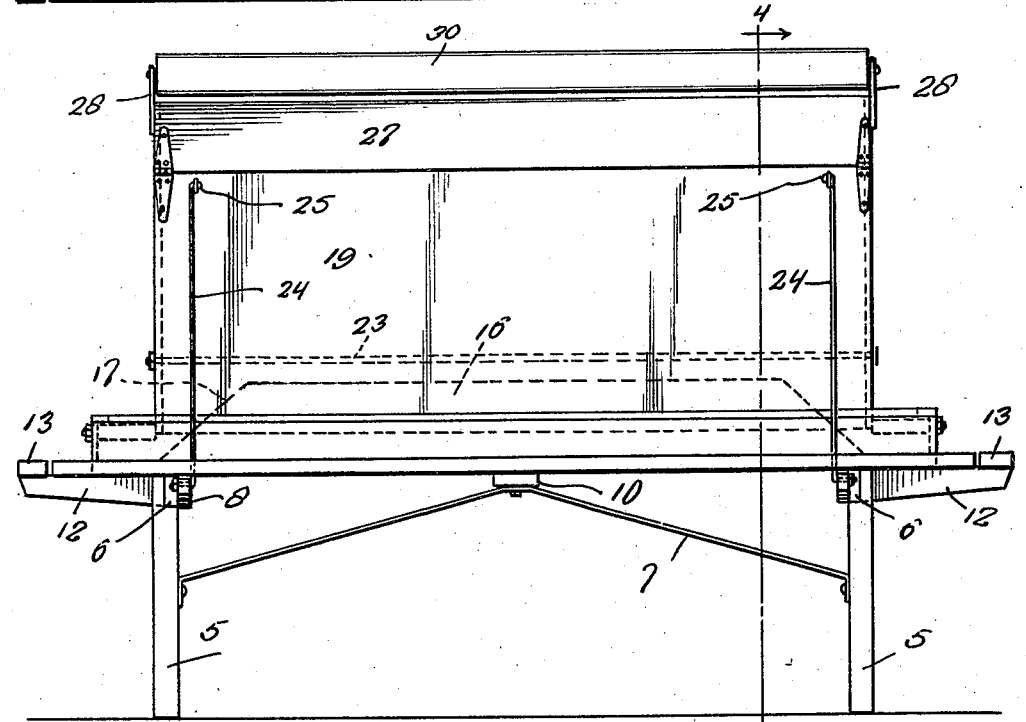
Figure 2 is a side elevational view thereof.

Referring in detail to the drawings, the embodiment of the invention illustrated includes a supporting stand having pairs of end legs 5 rigidly connected at their upper ends by means of cross bars 6 and rigidly braced against movement toward or away from each other by means of longitudinal strap-metal braces 7 rigidly connecting the legs at each side of the supporting stand.

Centrally pivoted as at 8ª against the inner sides of the cross bars 6 and located respectively at the opposite ends of the supporting stand are transverse horizontal supporting bars 8 whose ends project outwardly beyond the legs at opposite sides of the feeder and have longitudinal perch bars 9 fixed upon the ends thereof. A longitudinal perch bar 9 is thus mounted at each side of the supporting stand.

I also provide a transverse bar or brace 10 to which the intermediate portions of the longitudinal leg braces 7 are fastened as at 11. Rigidly secured to and projecting outwardly from the cross bars 6 are end supporting arms or brackets 12 which are arranged in pairs and in spaced relation at the opposite ends of the supporting stand. Transverse end perch bars 13 are secured upon the outer ends of the arms or brackets 12 directly at the opposite ends of the longitudinal perch bars 9.

Removably seated upon the cross bars 6 within the space bounded by the perch bars 9 and 13 is a pan-shaped base 14 having an upstanding marginal rim provided with an inwardly projecting continuous guard flange 15 on the upper edge thereof. Disposed centrally of and upon the bottom of the pan 14 is an inverted V-shaped feed spreader 16 having sloping end walls 17. This spreader 16 is of a size to leave a uniform space entirely about and between the same and the rim of the pan 14 so as to provide opposed side and end feed troughs as at 18.

An open bottom hopper 19 is mounted over the feed spreader 16 at its lower end, the side and end walls of the hopper being disposed in spaced relation to the walls of the feed spreader 16 and in spaced relation to and inwardly of the ends and sides of the rim of the pan 14, thus permitting free access to the feed within the troughs 18 on the part of fowls occupying the perches 9 or 13. Obviously, this arrangement permits the accommodation of a maximum number of fowls which may feed at any or all points about the hopper. The flange 15 effectively prevents a material amount of the feed from being thrown out of the feed troughs onto the ground and wasted.

Alined longitudinal supporting rods or bolts 20 are arranged at opposite ends of the pan 14 intermediate the sides of the latter, said bolts being respectively mounted at their opposite ends in openings provided in the end walls 17 of the feed spreader 16 and the adjacent end wall or portion of the rim of pan 14 as shown clearly in Figure 3. These bolts or rods are firmly held in place by means of nuts or the like and are horizontally disposed above the bottom of the pan 14 as shown. The end walls of the hopper 19 have notches 21 formed in and centrally of the lower edges thereof for seating reception upon the intermediate portions of the supporting rods or bolts 20, thus pivotally sustaining the hopper 19 at the required elevation above the bottom of the pan 14 and in such relation to the feed spreader 16 as to permit the feed to flow by gravity down the sides and ends of the feed spreader into the troughs 18 from the feed hopper. In order to aid in centralizing the hopper relative to the ends of the pan 14, suitable spacing sleeves 22 are fitted on the outer end portions of the bolts or rods 20 so as to be abutted at their inner ends by the end walls of the hopper 19 when the latter is operatively disposed as shown in the several views. The end walls of the hopper 19 may be suitably braced by means of a horizontal or longitudinal brace rod 23 connecting said end walls sufficiently above the bottom of the hopper 19 to clear the top of the feed spreader 16 when the hopper is operatively positioned as shown in Figure 3. In order to permit displacement of the hopper laterally from the pan and from over the feed spreader 16 to an out-of-the-way position, and yet sustain the hopper in a substantially vertical position when seated upon the bolts or rods 20, a pair of links 24 are pivoted to the outer end portions of the supporting bars 8 at one side of the feeder and are pivotally attached at their upper ends to the adjacent side of the hopper near the top thereof as at 25, the pivotal connection of the links 24 at their lower ends with the supporting bars 8 being indicated at 26. It is thus apparent that the hopper 19 may be readily elevated or lifted off of the supporting bolts or rods 20 and swung laterally to one side with the links 24, thus permitting easy access to the pan 14 for cleaning purposes. On the other hand, when the hopper is seated upon the bolts or rods 20 the links 24 will occupy an upwardly and inwardly inclined position so as to effectively sustain the hopper in a vertical operative position as seen clearly in Figure 4. The top of the hopper 19 is preferably closed by means of a hinged cover 27 having sloping side walls and vertical end walls as shown.

Uprights 28 are rigidly fastened to the end walls of the cover 27 so as to project above the latter, and journaled in the upper ends of the uprights 28 as at 29 is a horizontal bar 30 which may be used as a handle for raising the cover 27 and which is of flat form or elongated cross section so that it will tilt or rotate should a fowl attempt to perch thereon. Obviously, this effectively prevents fowls from perching on the top of the feed hopper.

From the foregoing description it will be seen that the present invention provides a simple, compact and efficient poultry feeder which may be economically manufactured and readily kept clean, and which provides for the simultaneous feeding of a maximum number of fowls.

It will be noted that the supporting bars 8 are slightly spaced from the pan 14 so as to have limited swinging movement. Thus, when the fowls jump onto or off of the perch bars 9, the bars 8 are slightly tilted one way or the other so as to correspondingly tilt the feed hopper 19 through the medium of links 24 and induce movement of the feed from the hopper should the feed tend to clog between the lower portion of the hopper and the feed spreader 16.

Minor changes may be made without departing from the spirit and scope of the invention as claimed.

What I claim as new is:

1. In a poultry feeder, a pan-shaped base, a feed spreader centrally disposed within said base, an open bottom feed hopper mounted at its lower end over said feed spreader to leave a continuous feed trough about the same, said feed spreader having sloping end walls, horizontal supporting rods connecting the end walls of the feed spreader with the adjacent end walls of the rim of the base, said feed hopper having central notches in the lower edges of the end walls thereof for removable seating reception upon said rods, and means for sustaining the hopper in a vertical position when seated on said rods, said last named means permitting lateral displacement of the hopper from operative position over said feed spreader.

2. In a poultry feeder, a pan-shaped base, a feed spreader centrally displaced within said base, an open bottom feed hopper mounted at its lower end over said feed spreader to leave a continuous feed trough about the same, said feed spreader having sloping end walls, horizontal supporting rods connecting the end walls of the feed spreader with the adjacent end walls of the rim of the base, said feed hopper having central notches in the lower edges of the end walls thereof for removable and pivotal seating reception upon said rods, means for sustaining the hopper in a vertical position when seated on said rods, said last named means permitting lateral displacement of the hopper from operative position over said feed spreader and comprising a pair of links pivotally attached to one side of the hopper near the top thereof, and pivoted perch-supporting bars to which the lower ends of said links are pivotally attached.

3. In a poultry feeder, a supporting stand comprising pairs of end legs rigidly connected at their upper ends by means of transverse bars, transverse horizontal supporting bars pivoted at opposite ends of the supporting stand at the top thereof and having their opposite ends projecting beyond the legs at opposite sides of said stand, longitudinal perch bars mounted upon the projecting ends of said supporting bars, supporting arms rigid with and projecting outwardly from opposite ends of said supporting stand, transverse and perch bars mounted upon the outer ends of said supporting arms, a pan-shaped base mounted on the top of the supporting stand within the space bounded by said longitudinal and end perch bars, a feed spreader centrally mounted in the pan-shape base, an open bottom hopper tiltably mounted over the spreader within the rim of the base to leave a continuous feed trough in the latter about said hopper, and links connecting said pivoted perch supporting bars to the hopper.

4. In a poultry feeder, a pan-shaped base, a feed spreader mounted in the base centrally thereof, supporting bolts at opposite ends of the base sustained by the latter and the ends of the feed spreader, a feed hopper removably seated on said supporting bolts, and means sustaining the hopper in a vertical position adapted to permit lateral displacement thereof from over the feed spreader.

5. In a poultry feeder, a pan-shaped base, a feed spreader mounted in the base centrally thereof, supporting bolts at opposite ends of the base sustained by the latter and the ends of the feed spreader, a feed hopper removably seated on said supporting bolts, means sustaining the hopper in a vertical position adapted to permit lateral displacement thereof from over the feed spreader, and spacing members on said bolts adapted to abut the ends of the hopper at their inner ends to centralize the hopper with respect to the ends of the base and the ends of the feed spreader when the hopper is seated on said supporting bolts.

6. In a poultry feeder, a base comprising a feed spreader and a continuous feed trough about said feed spreader, horizontal supporting elements sustained by the ends of the feed spreader and the ends of the base above the bottom of the feed trough, and a feed hopper removably seated on said horizontal supporting elements.

7. In a poultry feeder, a base comprising a feed spreader and a continuous feed trough about said feed spreader, horizontal supporting elements sustained by the ends of the feed spreader and the ends of the base above the bottom of the feed trough, a feed hopper removably seated on said horizontal supporting elements, and means to sustain the hopper in a vertical position, said last-named means permitting lateral displacement of the hopper relative to the base.

8. In a poultry feeder, a base comprising a feed spreader and a continuous feed trough about said feed spreader, horizontal supporting elements sustained by the ends of the feed spreader and the ends of the base above the bottom of the feed trough, a feed hopper removably seated on said horizontal supporting elements, means to sustain the hopper in a vertical position, said last-named means permitting lateral displacement of the hopper relative to the base, and means to sustain the lower end of the hopper against lateral displacement when seated on said horizontal supporting elements.

9. In a poultry feeder, a pan-shaped base, a feed spreader centrally disposed within said base, an open-bottom feed hopper pivotally mounted at its lower end over said feed spreader for lateral tilting movement relative to the latter, and movable perch bars operatively connected to the feed hopper for tilting the latter when said perch bars are depressed by the weight of fowls thereon.

10. In a poultry feeder, feed troughs, supporting bars pivoted for limited vertical swinging movement, perch bars carried by opposite ends of said supporting bars at opposite sides of said feed troughs, a feed spreader for said feed troughs, a laterally tiltable feed hopper mounted over the feed spreader, and links connecting said feed hopper with corresponding ends of said supporting bars.

11. In a poultry feeder, a feed spreader, a laterally tiltable feed hopper mounted over said feed spreader, and depressible perch bars operatively connected to the feed hopper for tilting the latter.

In testimony whereof I affix my signature.

CHARLES SOMMERS.